US012792072B2

(12) United States Patent
Chang

(10) Patent No.: US 12,792,072 B2
(45) Date of Patent: Nov. 10, 2026

(54) CONTROL CHIP AND CONTROL METHOD

(71) Applicant: Nuvoton Technology Corporation, Hsinchu Science Park (TW)

(72) Inventor: Hen-Kai Chang, Hsinchu City (TW)

(73) Assignee: Nuvoton Technology Corporation, Hsinchu Science Park (TW)

( * ) Notice: Subject to any disclaimer, the term of this patent is extended or adjusted under 35 U.S.C. 154(b) by 133 days.

(21) Appl. No.: 18/809,610

(22) Filed: Aug. 20, 2024

(65) Prior Publication Data

US 2025/0068200 A1 Feb. 27, 2025

(30) Foreign Application Priority Data

Aug. 23, 2023 (TW) ................................ 112131589

(51) Int. Cl.
*G06F 1/26* (2006.01)
*G05F 1/56* (2006.01)
*G06F 1/3203* (2019.01)

(52) U.S. Cl.
CPC .............. *G05F 1/56* (2013.01); *G06F 1/3203* (2013.01)

(58) Field of Classification Search
CPC .......... G05F 1/56; G06F 1/206; G06F 1/3206; G06F 1/3243; G06F 1/3287; G06F 9/4418; G06F 1/3203
USPC .......................................................... 713/320
See application file for complete search history.

(56) References Cited

U.S. PATENT DOCUMENTS

| | | | | |
|---|---|---|---|---|
| 11,784,635 | B1 * | 10/2023 | Chang | H03K 5/01 327/225 |
| 2010/0306557 | A1 * | 12/2010 | Chen | G06F 1/3215 713/300 |
| 2011/0246138 | A1 * | 10/2011 | Chung | G06F 13/4072 702/186 |
| 2013/0191665 | A1 * | 7/2013 | Mehta | G06F 1/324 713/323 |
| 2016/0217672 | A1 * | 7/2016 | Yoon | A61B 5/4818 |
| 2017/0108916 | A1 * | 4/2017 | Huang | G06F 1/3206 |
| 2017/0192492 | A1 * | 7/2017 | Li | G06F 1/3206 |
| 2019/0369695 | A1 * | 12/2019 | Wang | G06F 3/04817 |
| 2020/0251918 | A1 * | 8/2020 | Fu | H02J 1/082 |
| 2020/0326768 | A1 * | 10/2020 | Wahl | G06F 1/1694 |

(Continued)

FOREIGN PATENT DOCUMENTS

| | | | |
|---|---|---|---|
| TW | 201137607 | A | 11/2011 |
| TW | 202127193 | A | 7/2021 |
| TW | 202238422 | A | 10/2022 |

*Primary Examiner* — Volvick Derose
(74) *Attorney, Agent, or Firm* — MUNCY, GEISSLER, OLDS & LOWE, P.C.

(57) ABSTRACT

A control chip including a detection circuit, a management circuit, and a main core circuit is provided. The detection circuit enables a first wake-up signal in response to a specific event occurring. The management circuit determines whether a wake-up condition is satisfied in response to the first wake-up signal being enabled. In response to the wake-up condition being satisfied, the management circuit enables a second wake-up signal. The main core circuit enters a normal mode from a sleep mode according to the second wake-up signal. In response to the specific event not occurring, the management circuit and the main core circuit operate in the sleep mode. In response to the wake-up condition not being satisfied, the main core circuit operates in the sleep mode.

16 Claims, 5 Drawing Sheets

200

(56) References Cited

U.S. PATENT DOCUMENTS

| | | | | |
|---|---|---|---|---|
| 2021/0103329 | A1* | 4/2021 | Gougeon | G06F 1/3206 |
| 2021/0241759 | A1* | 8/2021 | Yang | G06F 3/167 |
| 2022/0062701 | A1* | 3/2022 | Renault | A63B 24/0003 |
| 2022/0179473 | A1* | 6/2022 | Ranel | G06F 1/206 |
| 2024/0412728 | A1* | 12/2024 | Peterson | G10L 15/063 |

* cited by examiner

100

200

300

CONTROL CHIP AND CONTROL METHOD

CROSS REFERENCE TO RELATED APPLICATIONS

This application claims priority of Taiwan Patent Application No. 112131589, filed on Aug. 23, 2023, the entirety of which is incorporated by reference herein.

BACKGROUND OF THE INVENTION

Field of the Invention

The present invention relates to a control chip, and, in particular, to a control chip that provides a wake-up function.

Description of the Related Art

In general, some circuits in a control chip enter a sleep mode in order to save power. As long as any wake-up condition is satisfied, all circuits will be woken up. Therefore, inrush current will be generated, and the instantaneous power consumption of the control chip is very large.

BRIEF SUMMARY OF THE INVENTION

In accordance with an embodiment of the disclosure, a control chip comprises a detection circuit, a management circuit, and a main core circuit. The detection circuit enables a first wake-up signal in response to a specific event occurring. The management circuit determines whether a wake-up condition is satisfied in response to the first wake-up signal being enabled. In response to the wake-up condition being satisfied, the management circuit enables a second wake-up signal. The main core circuit enters a normal mode from a sleep mode according to the second wake-up signal. In response to the specific event not occurring, the management circuit and the main core circuit operate in the sleep mode. In response to the wake-up condition not being satisfied, the main core circuit operates in the sleep mode.

A control method for a control chip is provided. An exemplary embodiment of the control method is described in the following paragraph. All circuits in the control chip are directed to enter a sleep mode. A first detection circuit is utilized to detect whether a specific event occurs. A management circuit of the control chip is woken up in response to the specific event occurring. The management circuit is utilized to determine whether a wake-up condition is satisfied. A main core circuit of the control chip is woken up in response to the wake-up condition being satisfied.

Control method may be practiced by the systems which have hardware or firmware capable of performing particular functions and may take the form of program code embodied in a tangible media. When the program code is loaded into and executed by an electronic device, a processor, a computer or a machine, the electronic device, the processor, the computer or the machine becomes a control chip for practicing the disclosed method.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
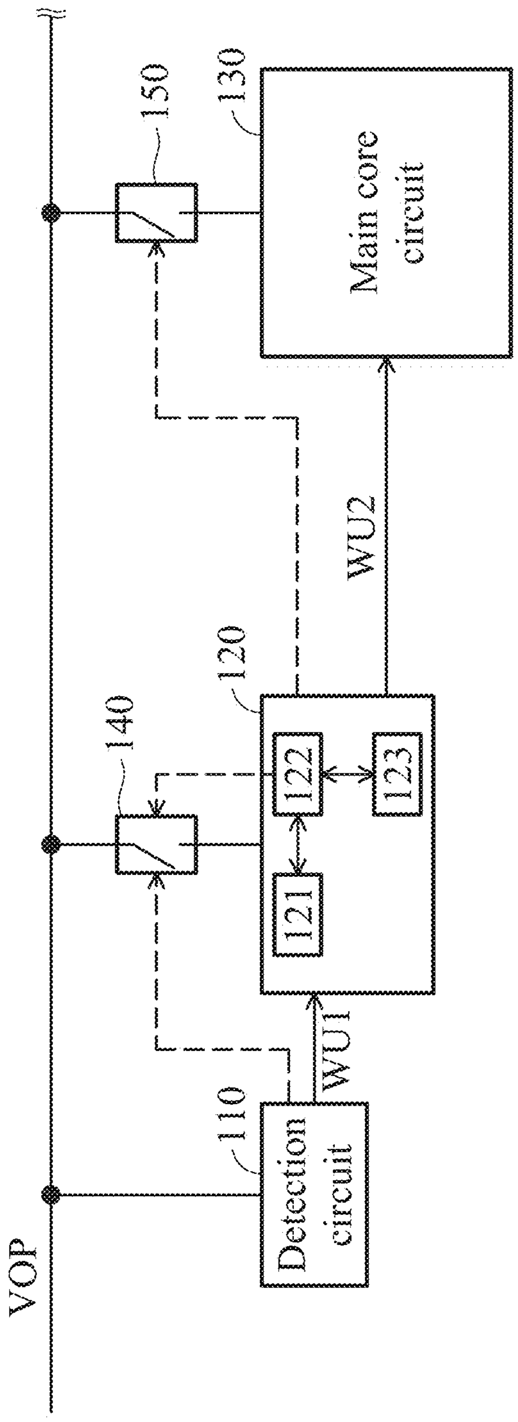
FIG. 1 is a schematic diagram of an exemplary embodiment of a control chip according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of a control chip according to various aspects of the present disclosure. The control chip 100 comprises a detection circuit 110, a management circuit 120, and a main core circuit 130. In this embodiment, the complexity of the detection circuit 110 is less than the complexity of the management circuit 120, and the complexity of the management circuit 120 is less than the complexity of the main core circuit 130. Therefore, when the detection circuit 110, the management circuit 120, and the main core circuit 130 operate normally, the power consumption of the detection circuit 110 is less than the power consumption of the management circuit 120, and the power consumption of the management circuit 120 is less than the power consumption of the main core circuit 130. In other words, in the control chip 100, the detection circuit 110 belongs to a small domain, the management circuit 120 belongs to a middle domain, and the main core circuit 130 belongs to a main domain.

The detection circuit 110 receives an operation voltage VOP and detects whether a first specific event occurs. When the first specific event occurs, the detection circuit 110 enables a wake-up signal WU1. The structure of the detection circuit 110 is not limited in the present disclosure. Any circuit can serve the detection circuit 110, as long as the circuit has a detection function. In one embodiment, the detection circuit 110 detects electrical characteristics, such as voltages, currents, frequencies, etc. In another embodiment, the detection circuit 110 detects environmental characteristics, such as temperature, humidity, etc. Taking temperature as an example, when the environmental temperature has reached a threshold value, the detection circuit 110 enables the wake-up signal WU1. When the environmental temperature has not reached the threshold value, the detection circuit 110 does not enable the wake-up signal WU1. In other embodiments, the detection circuit 110 comprises a timer (not shown). The timer enables the wake-up signal WU1 at every fixed time interval.

In some embodiments, the detection circuit 110 continues to receive the operation voltage VOP. As long as the operation voltage VOP has reached a target value, the detection circuit 110 is always-on. In this case, if either the management circuit 120 or the main core circuit 130 enters the sleep mode, the detection circuit 110 continues to operate and continues to detect whether the first specific event occurs.

When the wake-up signal WU1 is enabled, the management circuit 120 enters a normal mode from the sleep mode. In the normal mode, the management circuit 120 determines whether a wake-up condition is satisfied. When the wake-up condition is satisfied, the management circuit 120 enables a wake-up signal WU2. In one embodiment, the wake-up condition is the occurrence of a second specific event. In this case, when a second specific event occurs, the management circuit 120 enables the wake-up signal WU2. The structure of the management circuit 120 is not limited in the present disclosure. In one embodiment, the management circuit 120 manages peripheral circuits, powers and interruptions, etc.

In some embodiments, when the wake-up condition is not satisfied, the management circuit 120 resets the detection circuit 110. Therefore, the detection circuit 110 re-detects whether the first specific event occurs. After resetting the detection circuit 110, the management circuit 120 re-enters the sleep mode from the normal mode. In one embodiment, when the wake-up condition is not satisfied, the management circuit 120 resets the timer of the detection circuit 110. The timer of the detection circuit 110 re-counts and enables the wake-up signal WU1 at every fixed time interval. In this case, the management circuit 120 determines whether the wake-up condition is satisfied at every fixed time interval.

The main core circuit 130 enters a normal mode from a sleep mode according to the wake-up signal WU2. In one embodiment, when the wake-up signal WU2 is enabled, the main core circuit 130 leaves the sleep mode and enters the normal mode. The structure of the main core circuit 130 is not limited in the present disclosure. In one embodiment, the main core circuit 130 has a high-speed CPU.

In some embodiments, when the first specific event does not occur, the management circuit 120 and the main core circuit 130 are maintained in the sleep mode. When the first specific event occurs, the management circuit 120 leaves the sleep mode. At this time, since the main core circuit 130 is maintained in the sleep mode, the power consumption of the control chip 100 does not be increased significantly and surge current does not occur easily. When the wake-up condition is not satisfied, the main core circuit 130 still maintains in the sleep mode. At this time, the management circuit 120 may re-enter the sleep mode until the wake-up signal WU1 is re-enabled.

In one embodiment, the management circuit 120 comprises a memory 121 and a logic circuit 122. The memory 121 is configured to store a program code. The type of memory 121 is not limited in the present disclosure. In one embodiment, the memory 121 is a non-volatile memory (NVM), such as a flash. In other embodiments, the memory 121 further stores at least one threshold value. The threshold values may be written into the memory 121 by the logic circuit 122 or the main core circuit 130. For example, when the logic circuit 122 or the main core circuit 130 operates in the normal mode, the logic circuit 122 or the main core circuit 130 adjusts at least one of the threshold values stored in the memory 121.

The logic circuit 122 accesses the memory 121 to perform the program code. The logic circuit 122 executes a determination operation according to the program code to generate a determination result. When the determination result matches a predetermined value, it is determined that the wake-up condition is satisfied. Therefore, the logic circuit 122 enables the wake-up signal WU2. For example, the logic circuit 122 detects the environmental temperature and determines whether the environmental temperature has reached a threshold value. When the environmental temperature has reached the threshold value, the logic circuit 122 enables the wake-up signal WU2.

In another embodiment, the logic circuit 122 wakes at least one detection mechanism up according to the program code. For example, the logic circuit 122 first detects the environmental temperature and determines whether the environmental temperature has reached a threshold value according to the program code. When the environmental temperature has reached the threshold value, the logic circuit 122 wakes a first detection circuit (not shown) up. The first detection circuit detects whether a first wake-up event occurs. For example, the first wake-up event may be that a specific current reaches a first predetermined value. When the specific current reaches a first predetermined value, the logic circuit 122 enables the wake-up signal WU2. In this case, the wake-up condition is satisfied when the environmental temperature has reached a threshold value and the specific current has reached a first predetermined value.

In some embodiments, when the first wake-up event occurs, the logic circuit 122 wakes a second detection circuit up. The second detection circuit detects whether a second wake-up event occurs. For example, when a specific voltage reaches a second predetermined value, it means that a second wake-up event occurs. When the second wake-up event occurs, the logic circuit 122 enables the wake-up signal WU2. In this case, the wake-up condition is satisfied when the environmental temperature has reached a threshold value, the specific current has reached a first predetermined value, and the specific voltage has reached a second predetermined value.

The present disclosure does not limit the wake-up conditions. In some embodiments, the wake-up condition is satisfied when at least one specific event occurs, such as the environment temperature reaching a threshold value, a specific current reaching a first predetermined value, or a specific voltage reaching a second predetermined value. The logic circuit 122 triggers various wake-up mechanisms (referred to as detection circuits) according to the program codes stored in the memory 121, so that different wake-up combinations can be set. In addition, the logic circuit 122 appropriately adjusts the threshold value stored in the memory 121 according to the reports from each detection circuit.

In other embodiments, the management circuit 120 further comprises a detection circuit 123. When the wake-up signal WU1 has been enabled, the management circuit 120 activates the detection circuit 123. The detection circuit 123 detects whether a second specific event (or called a wake-up event) occurs. When a second specific event occurs, such as the temperature reaching a predetermined value, the detection circuit 123 notifies the logic circuit 122. Therefore, the logic circuit 122 enables the wake-up signal WU2. The structure of the detection circuit 123 is not limited in the present disclosure. Any circuit can serve as the detection circuit 123, as long as the circuit has a detection function.

In some embodiments, the control chip 100 further comprises switches 140 and 150. The switch 140 is coupled to the management circuit 120. When a first specific event occurs, the switch 140 is turned on to transmit the operation voltage VOP to the management circuit 120. At this time, the management circuit 120 leaves a sleep mode and enters a normal mode. In the normal mode, the management circuit 120 determines whether a wake-up condition is satisfied. However, when the first specific event does not occurs, the switch 140 does not be turned on. Therefore, the switch 140 stops transmitting the operation voltage VOP to the management circuit 120. Therefore, the management circuit 120 enters the sleep mode. In the sleep mode, the management circuit 120 stops determining whether the wake-up condition is satisfied. In one embodiment, the switch 140 is controlled by the detection circuit 110. In this case, when the first specific event occurs, the detection circuit 110 turns on the switch 140. When the first specific event does not occur, the detection circuit 110 turns off the switch 140.

The switch 150 is coupled to the main core circuit 130. When a fir wake-up condition is satisfied, the switch 150 is turned on to transmit the operation voltage VOP to the main core circuit 130. Therefore, the main core circuit 130 leaves a sleep mode and enters a normal mode. However, when the wake-up condition is not satisfied, the switch 150 is turned off to stop transmitting the operation voltage VOP to the main core circuit 130. Therefore, the main core circuit 130 enters the sleep mode.

In one embodiment, the switch 150 is controlled by the management circuit 120. In this case, when the wake-up condition is satisfied, the management circuit 120 turns on the switch 150. When the wake-up condition is not satisfied, the management circuit 120 turns off the switch 150. In other embodiments, the management circuit 120 further controls the switch 140. When the wake-up condition is not satisfied, the management circuit 120 turns off the switch 140.

Figure 2:
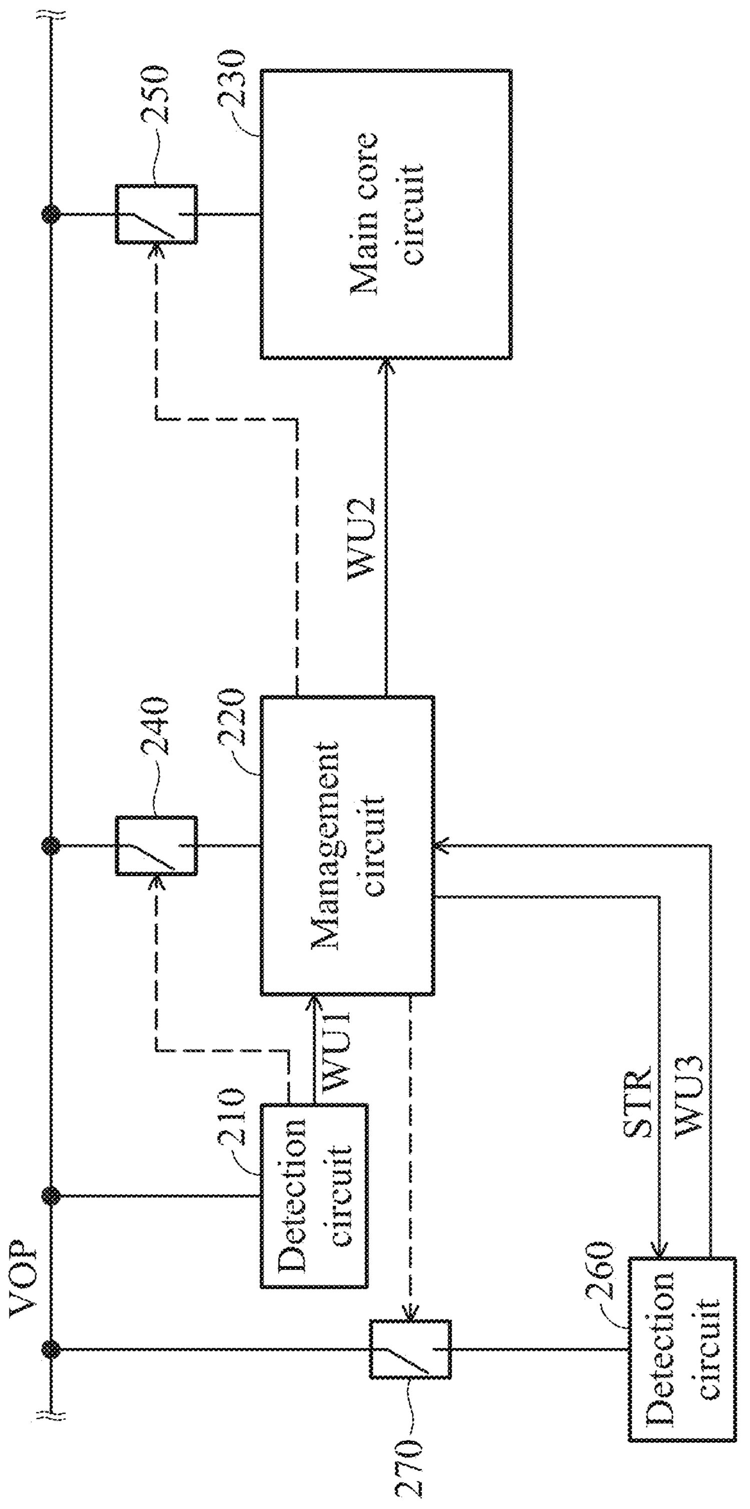
FIG. 2 is a schematic diagram of another exemplary embodiment of the control chip according to various aspects of the present disclosure.

FIG. 2 is a schematic diagram of another exemplary embodiment of the control chip according to various aspects of the present disclosure. The control chip 200 comprises detection circuits 210 and 260, a management circuit 220, and a main core circuit 230. In this embodiment, the detection circuit 210 continues to receive the operation voltage VOP. Therefore, the detection circuit 210 is always on. Even if the detection circuit 260, the management circuit 220 and the main core circuit 230 enter the sleep mode, the detection circuit 210 still operates in the normal mode. In other words, the detection circuit 210 never enters the sleep mode.

The detection circuit 210 detects whether a first specific event occurs. When the first specific event occurs, the detection circuit 210 enables the wake-up signal WU1 to wake the management circuit 220 up. Since the characteristic of the detection circuit 210 shown in FIG. 2 is similar to the characteristic of the detection circuit 110 shown in FIG. 1, the related description is omitted here.

When the wake-up signal WU1 is enabled, the management circuit 220 leaves a sleep mode and enters a normal mode. In the normal mode, the management circuit 220 determines whether a wake-up condition is satisfied. In one embodiment, the management circuit 220 activates a detection circuit of itself to determine whether a second specific event (such as whether the temperature has reached a first threshold value) occurs. In this case, when the second specific event occurs, the management circuit 220 enables a trigger signal STR. When the second specific event does not occur, the management circuit 220 does not enable the trigger signal STR. In another embodiment, when the wake-up signal WU1 is enabled, the management circuit 220 directly enables the trigger signal STR. When the wake-up signal WU1 does not be enabled, the management circuit 220 does not enable the trigger signal STR. In other embodiments, after enabling the trigger signal STR, the management circuit 220 leaves the normal mode and re-enters the sleep mode.

The detection circuit 260 operates according to the trigger signal STR. For example, when the trigger signal STR is enabled, the detection circuit 260 detects whether a third specific event occurs. When the third specific event occurs (such as whether a specific current has reached a second threshold value), the detection circuit 260 enables a wake-up signal WU3. When the third specific event does not occur, the detection circuit 260 does not enable the wake-up signal WU3. The structure of the detection circuit 260 is not limited in the present disclosure. Any circuit can serve as the detection circuit 260, as long as the circuit has a detection function. In one embodiment, the characteristic of the detection circuit 260 shown in FIG. 2 is similar to the characteristic of the detection circuit 110 shown in FIG. 1.

When the wake-up signal WU3 is enabled, it is determined that a wake-up condition is satisfied, such as the temperature reaching the first threshold value, and the specific current reaching the second threshold value. Therefore, the management circuit 220 uses the wake-up signal WU2 to wake the main core circuit 230 up. The present disclosure does not limit the number of specific events included in the wake-up condition. In other embodiments, the wake-up condition is satisfied when more specific events occur. For example, when the temperature has reached a first threshold value, a current has reached a second threshold value, and a frequency has reached a third threshold value, it is determined that the wake-up condition is satisfied. Since the characteristic of the management circuit 220 shown in FIG. 2 is similar to the characteristic of the management circuit 120 shown in FIG. 1, the related description is omitted here.

When the wake-up signal WU2 is enabled, the main core circuit 230 leaves a sleep mode and enters a normal mode. In the normal mode, the power consumption of the main core circuit 230 is larger than the power consumption of the management circuit 220. Since the characteristic of the main core circuit 230 shown in FIG. 2 is similar to the characteristic of the main core circuit 130 shown in FIG. 1, the related description is omitted here.

In other embodiments, the control chip 200 further comprises switches 240, 250, and 270. The switch 240 is coupled to the management circuit 220. When a first specific event occurs, the detection circuit 210 turns on the switch 240. Therefore, the switch 240 transmits the operation voltage VOP to the management circuit 220. However, when the first specific event does not occur, the detection circuit 210 turns off the switch 240. Therefore, the switch 240 stops transmitting the operation voltage VOP to the management circuit 220.

The switch 250 is coupled to the main core circuit 220 and controlled by the management circuit 220. When a wake-up condition is satisfied, the management circuit 220 turns on the switch 250. Therefore, the switch 250 transmits the operation voltage VOP to the main core circuit 230. However, when the wake-up condition is not satisfied, the management circuit 220 turns off the switch 250. Therefore, the switch 250 stops transmitting the operation voltage VOP to the main core circuit 230.

The switch 270 is coupled to the detection circuit 260 and controlled by the management circuit 220. For example, when the wake-up signal WU1 is enabled, the management circuit turns on the switch 270. Therefore, the switch 270 transmits the operation voltage VOP to the detection circuit 260. However, when the wake-up signal WU1 does not be enabled, the management circuit 220 turns off the switch 270. Therefore, the switch 270 stops transmitting the operation voltage VOP to the detection circuit 260.

Figure 3:
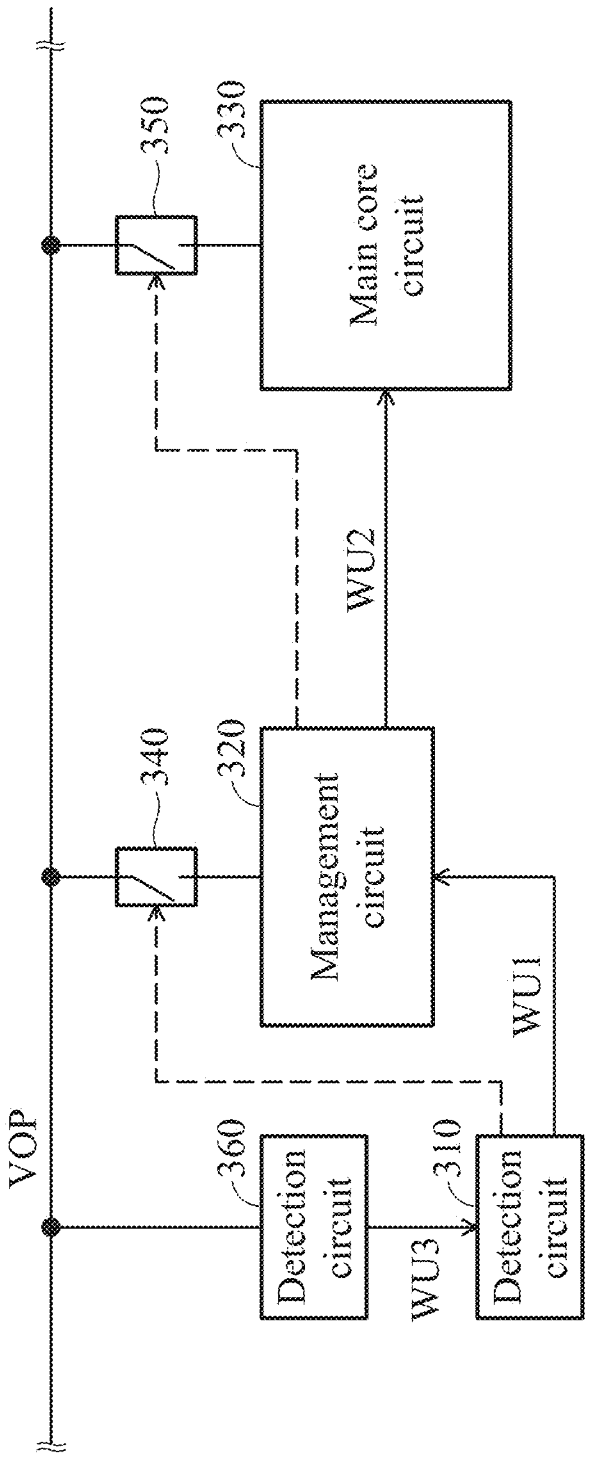
FIG. 3 is a schematic diagram of another exemplary embodiment of the control chip according to various aspects of the present disclosure.

FIG. 3 is a schematic diagram of another exemplary embodiment of the control chip according to various aspects of the present disclosure. The control chip 300 comprises detection circuits 310 and 360, a management circuit 320, and a main core circuit 330. In this embodiment, the detection circuit 360 continues to receive the operation voltage VOP. Therefore, the detection circuit 360 is always on. When the detection circuit 310, the management circuit 320 and the main core circuit 330 enter the sleep mode, the detection circuit 360 still operates in the normal mode. In other words, the detection circuit 360 never enters the sleep mode. In other embodiments, the detection circuits 310 and 360 continue to receive the operation voltage VOP. Therefore, the detection circuits 310 and 360 are always on. In this case, since the structures of the detection circuits 310 and 360 are relatively simple and have fewer components. Therefore, even if the detection circuits 310 and 360 do not enter the sleep mode, the detection circuits 310 and 360 do not cause too much power consumption.

The detection circuit 360 is configured to detect whether a third specific event occurs. When a third specific event occurs, the detection circuit 360 enables the wake-up signal WU3 to wake the detection circuit 310 up. Therefore, the detection circuit 310 starts detecting whether a first specific event occurs. When the first specific event occurs, the detection circuit 310 enables the wake-up signal WU1 to wake the management circuit 320 up. The management circuit 320 determines whether a wake-up condition is satisfied. When the wake-up condition is satisfied, the management circuit 320 enables the wake-up signal WU2 to wake the main core circuit 330 up.

In one embodiment, the detection circuit 360 comprises a timer (now shown). The timer enables the wake-up signal WU3 at every fixed time interval. When the wake-up signal WU3 is enabled, the detection circuit 310 detects whether a first specific event occurs, such as whether an environment temperature has reached a first threshold value. When the first specific event does not occur, the detection circuit 310 does not enable the wake-up signal WU1. However, when the first specific event occurs, the detection circuit 310 enables the wake-up signal WU1. When the wake-up signal WU1 is enabled, the management circuit 320 determines whether a second specific event occurs, such as whether a current has reached a second threshold value. When the second specific event does not occur, it is determined that a wake-up condition is not satisfied. Therefore, the management circuit 320 does not enable the wake-up signal WU2. However, when the second specific event occurs, it is determined that a wake-up condition is satisfied. Therefore, the management circuit 220 enables the wake-up signal WU2 to wake the main core circuit 330 up.

In another embodiment, the detection circuit 360 detects whether a third specific event occurs, such as whether a current has reached a second threshold value. When the third specific event does not occur, the detection circuit 360 does not enable the wake-up signal WU3. When the third specific event occurs, the detection circuit 360 enables the wake-up signal WU3. When the wake-up signal WU3 is enabled, the detection circuit 310 determines whether a first specific event occurs, such as whether an environment temperature has reached a first threshold value. When the first specific event does not occur, the detection circuit 310 does not enable the wake-up signal WU1. When the first specific event occurs, the detection circuit 310 enables the wake-up signal WU1. When the wake-up signal WU1 is enabled, it is determined that a wake-up condition is satisfied. Therefore, the management circuit 320 enables the wake-up signal WU2 to wake the main core circuit 330 up. However, when the wake-up signal WU1 does not be enabled, it is determined that a wake-up condition is not satisfied. Therefore, the management circuit 320 does not enable the wake-up signal WU2 and the main core circuit 330 maintains in the sleep mode.

In other embodiments, the control chip 300 further comprises switches 340 and 350. Since the characteristics of the switches 340 and 350 shown in FIG. 3 are similar to the characteristics of the switches 140 and 150 shown in FIG. 1, the related description is omitted here. In some embodiments, the detection circuit 310 may directly receive the operation voltage VOP. Therefore, the detection circuit 310 is always-on and never enters a sleep mode. In another embodiment, the detection circuit 310 is coupled to a switch (not shown). When the switch is turned off, the detection circuit 310 enters a sleep mode. When the detection circuit 360 enables the wake-up signal WU3, the detection circuit 360 turns on the switch which is coupled to the detection circuit 310. When the detection circuit 310 receives the operation voltage VOP, the detection circuit 310 leaves the sleep mode and enters a normal mode.

Figure 4:
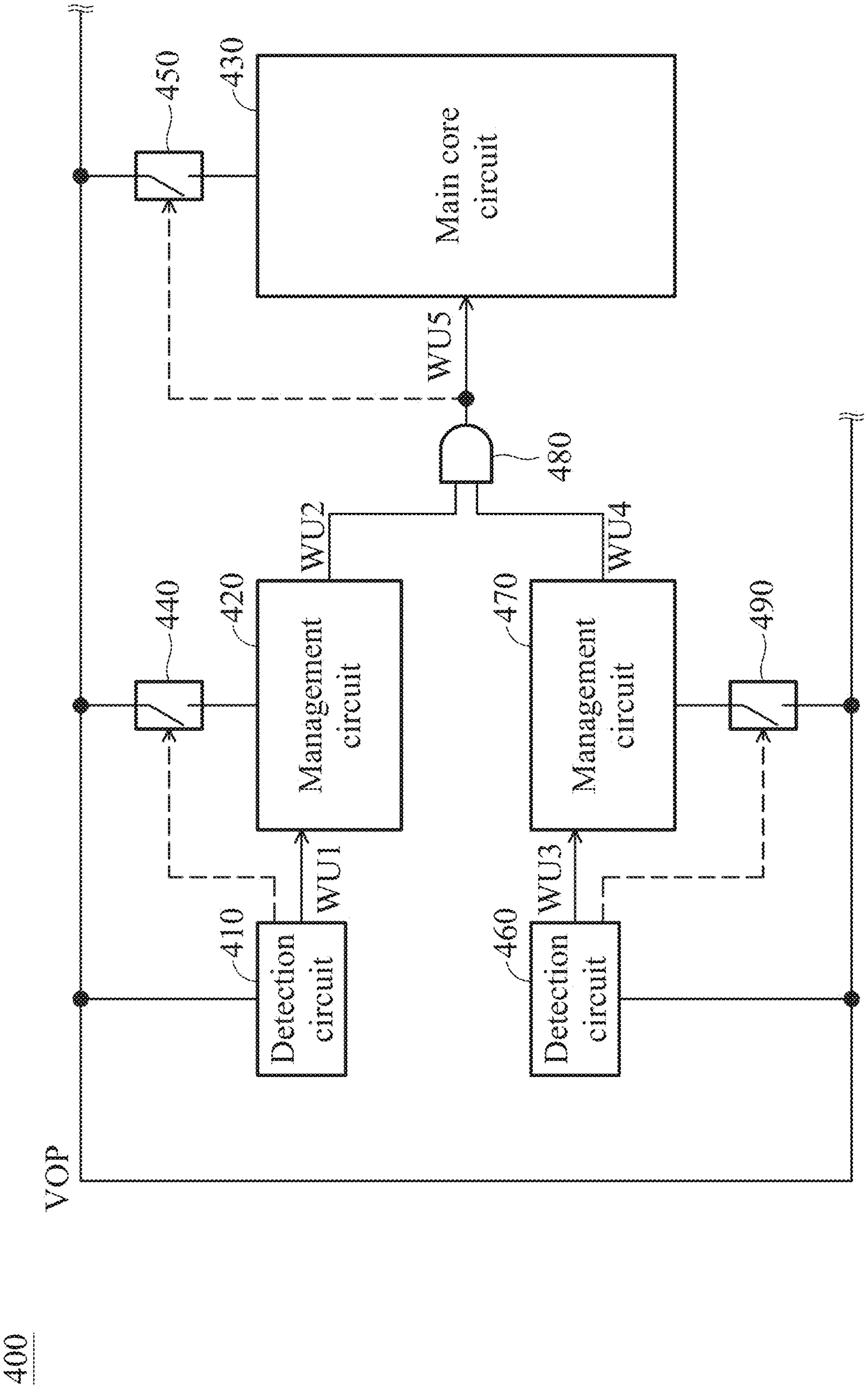
FIG. 4 is a schematic diagram of another exemplary embodiment of the control chip according to various aspects of the present disclosure.

FIG. 4 is a schematic diagram of another exemplary embodiment of the control chip according to various aspects of the present disclosure. The control chip 400 comprises detection circuits 410 and 460, management circuits 420 and 470, and a main core circuit 430. In one embodiment, the detection circuits 410 and 460 continue to receive the operation voltage VOP. Therefore, the detection circuits 410 and 460 are always-on. Even if the management circuits 420 and 470*m* and the main core circuit 430 enter the sleep mode, the detection circuits 410 and 460 work normally.

The detection circuit 410 detects whether a first specific event occurs. When the first specific event occurs, the detection circuit 410 enables the wake-up signal WU1. When the wake-up signal WU1 is enabled, the management circuit 420 leaves a sleep mode and enter a normal mode. In the normal mode, the management circuit 420 determines whether a first wake-up condition is satisfied. When the first wake-up condition is satisfied, the management circuit 420 enables the wake-up signal WU2. Since the characteristics of the detection circuit 410 and the management circuit 420 shown in FIG. 4 are similar to the characteristics of the detection circuit 110 and the management circuit 120 shown in FIG. 1, the related description is omitted here.

The detection circuit 460 detects whether a third specific event occurs. When the third specific event occurs, the detection circuit 460 enables the wake-up signal WU3. When the wake-up signal WU3 is enabled, the management circuit 470 leaves a sleep mode and enter a normal mode. In the normal mode, the management circuit 470 determines whether a second wake-up condition is satisfied. When the second wake-up condition is satisfied, the management circuit 470 enables the wake-up signal WU4. Since the characteristics of the detection circuit 460 and the management circuit 470 shown in FIG. 4 are similar to the characteristics of the detection circuit 110 and the management circuit 120 shown in FIG. 1, the related description is omitted here.

When the wake-up signals WU2 and WU4 are enabled, the main core circuit 430 leaves a sleep mode and enters a normal mode. Since the characteristic of the main core circuit 430 shown in FIG. 4 is similar to the characteristic of the main core circuit 130 shown in FIG. 1, the related description is omitted here.

In one embodiment, the control chip 400 further comprises a determination circuit 480. The determination circuit

480 receives the wake-up signals WU2 and WU4. When the wake-up signals WU2 and WU4 are enabled, the determination circuit 480 enables the wake-up signal WU5 to wake the main core circuit 430 up. The structure of the determination circuit 480 is not limited in the present disclosure. In one embodiment, the determination circuit 480 is an AND gate.

In one embodiment, the detection circuit 410 is configured to detect an external voice, and the detection circuit 460 is configured to detect an external image. When the detection circuit 410 detects an external voice, the detection circuit 410 enables the wake-up signal WU1. The management circuit 420 determines whether the external voice matches a first predetermined condition. In one embodiment, the management circuit 420 determines whether the external voice is a human voice. When the external voice matches the first predetermined condition, the management circuit 420 enables the wake-up signal WU2.

The detection circuit 460 is configured to detect whether an external image changes. When the external image changes, the detection circuit 460 enables the wake-up signal WU3. The management circuit 420 determines whether the external image matches a second predetermined condition. In one embodiment, the management circuit 420 determines whether a living body exists in the external image. When the external image matches the second predetermined condition, the management circuit 470 enables the wake-up signal WU4.

In other embodiments, the control chip 400 further comprises switches 440, 450, and 490. The switch 440 is coupled to the management circuit 420 and controlled by the detection circuit 410. When the detection circuit 410 turns on the switch 440, the switch 440 transmits the operation voltage VOP to the management circuit 420. When the detection circuit 410 turns off the switch 440, the switch 440 stops transmitting the operation voltage VOP to the management circuit 420.

The switch 450 is coupled to the main core circuit 430 and controlled by the determination circuit 480. When the wake-up signals WU2 and WU4 are enabled, the determination circuit 480 turns on the switch 450. Therefore, the switch 450 transmits the operation voltage VOP to the main core circuit 430. When one of the wake-up signals WU2 and WU4 does not be enabled, the determination circuit 480 turns off the switch 450. Therefore, the switch 450 stops transmitting the operation voltage VOP to the main core circuit 430.

The switch 490 is coupled to the management circuit 470 and controlled by the detection circuit 460. When the detection circuit 460 turns on the switch 490, the switch 490 transmits the operation voltage VOP to the management circuit 470. When the detection circuit 460 turns off the switch 490, the switch 490 stops transmitting the operation voltage VOP to the management circuit 470.

Figure 5:
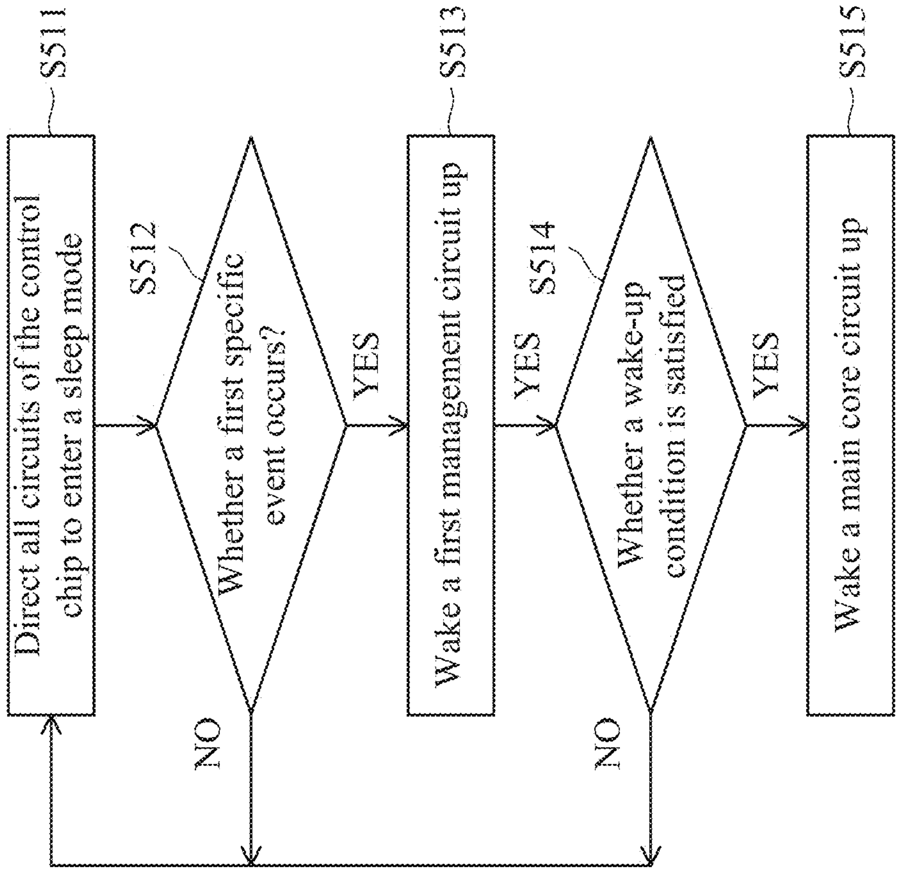
FIG. 5 is a flowchart of a control method in accordance with an embodiment of the present disclosure.

FIG. 5 is a flowchart of a control method in accordance with an embodiment of the present disclosure. Control methods may take the form of a program code. When the program code is loaded into and executed by a machine, the machine thereby becomes a control chip for practicing the methods.

First, all circuits of the control chip are controlled to enter a sleep mode (step S511). In one embodiment, the control chip has a detection circuit which is always-on. When all circuits in the control chip enter the sleep mode, the detection circuit which is always-on works normally and never enters a sleep mode.

The always-on detection circuit is used to detect whether a first specific event occurs (step S512). In one embodiment, the first specific event is that the counting value of a counter has reached a target value.

When the first specific event does not occur, step S511 is performed to maintain all circuits in the sleep mode. When the first specific event occurs, a first management circuit of the control chip is woken up (step S513). In one embodiment, when the first specific event occurs, step S513 is performed to turn on a switch which provides power to the first management circuit.

The first management circuit is used to determine whether a wake-up condition is satisfied (step S514). When the wake-up condition is not satisfied, step S511 is performed to maintain all circuits (comprising the first management circuit) of the control chip in the sleep mode. In one embodiment, when the wake-up condition is not satisfied, the first management circuit first resets the counter and enters the sleep mode.

When the wake-up condition is satisfied, the first management circuit is controlled to wake up a main core circuit of the control chip (step S515). In one embodiment, when the wake-up condition is satisfied, step S515 is performed to turn on another switch to provide power to the main core circuit.

In other embodiments, step S513 is performed to wake a second detection circuit up. The second detection circuit is configured to detect whether a second specific event occurs. When the second specific event occurs, it is determined that the wake-up condition is satisfied. Therefore, the main core circuit of the control chip is woken up (step S515). However, when the second specific event does not occurs, it is determined that the wake-up condition is not satisfied. Therefore, step S511 is performed to direct all circuit (comprising the second management circuit) of the control chip to enter the sleep mode.

In some embodiments, step S513 is performed to direct the first management circuit to wake up a second detection circuit first. The second detection circuit is configured to detect whether a second specific event occurs. When the second specific event occurs, step S513 is performed to direct the first management circuit to wake a third detection circuit up. The third detection circuit is configured to detect whether a third specific event occurs. When the third specific event occurs, it is determined that the wake-up condition is satisfied. Therefore, the first management circuit wakes the main core circuit of the control chip up (step S515). However, when the second specific event does not occurs, it is determined that the wake-up condition is not satisfied. Therefore, step S511 is performed to control all circuits (comprising the second and third detection circuits) of the control chip to enter the sleep mode.

Since most of the circuits in the control chip operate in the sleep mode, the power consumption of the control chip can be greatly reduced. Furthermore, the circuits in the control chip is gradually woken up. Whenever a specific event occurs, only the circuit that can handle the current event is woken up, so the purpose of saving power consumption can be achieved.

It will be understood that when an element or layer is referred to as being "coupled to" another element or layer, it can be directly on, connected or coupled to the other element or layer or intervening elements or layers may be present. In contrast, when an element or layer is referred to as be "directly connected to" another element or layer, there are no intervening elements or layers present. Additionally, "enable" shall mean changing the state of a Boolean signal.

Boolean signals may be enabled high or with a higher voltage, and Boolean signals may be enabled low or with a lower voltage, at the discretion of the circuit designer. Similarly, "disable" shall mean changing the state of the Boolean signal to a voltage level opposite the enabled state.

Control methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes a control chip for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes a control chip for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another. In the following claims, the terms "first," "second," etc. are used merely as labels, and are not intended to impose numerical requirements on their objects.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control chip comprising:

a first detection circuit enabling a first wake-up signal in response to a first specific event occurring;

a second detection circuit detecting whether a third specific event occurs in response to a trigger signal being enabled;

a first management circuit determining whether a first wake-up condition is satisfied in response to the first wake-up signal being enabled, wherein in response to the first wake-up condition being satisfied, the first management circuit enables a second wake-up signal; and a main core circuit entering a normal mode from a sleep mode according to the second wake-up signal, wherein:

in response to the first specific event not occurring, the first management circuit and the main core circuit operate in the sleep mode, and in response to the first wake-up condition not being satisfied, the main core circuit operates in the sleep mode, in response to the first wake-up signal being enabled, the first management circuit enables the trigger signal, in response to the third specific event occurring, the second detection circuit enables a third wake-up signal, in response to the third wake-up signal being enabled, the first management circuit enables the second wake-up signal, in response to the second wake-up signal being enabled, the main core circuit enters the normal mode from the sleep mode.

2. The control chip as claimed in claim 1, wherein in response to the first wake-up signal being enabled, the first management circuit determines whether a second specific event occurs, and in response to the second specific event occurring, the first management circuit enables the second wake-up signal.

3. The control chip as claimed in claim 2, further comprising:

a first switch coupled to the first management circuit; and a second switch coupled to the main core circuit, wherein:

in response to the first specific event occurring, the first switch is turned on to transmit an operation voltage to the first management circuit, and in response to the first specific event not occurring, the first switch is turned off to stop transmitting the operation voltage to the first management circuit, in response to the first wake-up condition being satisfied the second switch is turned on to transmit the operation voltage to the main core circuit, and in response to the first wake-up condition not being satisfied, the second switch is turned off to stop transmitting the operation voltage to the main core circuit.

4. The control chip as claimed in claim 3, wherein the first detection circuit turns on or off the first switch, and the first management circuit turns on or off the second switch.

5. The control chip as claimed in claim 1, wherein after enabling the trigger signal, the first management circuit enters the sleep mode.

6. The control chip as claimed in claim 1, further comprising:

a first switch coupled to the first management circuit;

a second switch coupled to the main core circuit; and a third switch coupled to the second detection circuit, wherein:

in response to the first specific event occurring, the first switch is turned on to transmit an operation voltage to the first management circuit, and in response to the first specific event not occurring, the first switch is turned off to stop transmitting the operation voltage to the first management circuit, in response to the trigger signal being enabled, the third switch is turned on to transmit the operation voltage to the second detection circuit, and in response to the trigger signal not being enabled, the third switch is turned off to stop transmitting the operation voltage to the second detection circuit, in response to the first wake-up condition being satisfied, the second switch is turned on to transmit the operation voltage to the main core circuit, and in response to the first wake-up condition not being satisfied, the second switch is turned off to stop transmitting the operation voltage to the main core circuit.

7. The control chip as claimed in claim 6, wherein the first detection circuit turns on or off the first switch, and the first management circuit turns on or off the second and third switches.

8. The control chip as claimed in claim 1, further comprising:

a third detection circuit determining whether a fourth specific event occurs, wherein in response to the fourth specific event occurring, the third detection circuit enables a fourth wake-up signal;

a second management circuit determining whether a second wake-up condition is satisfied in response to the fourth wake-up signal being enabled, wherein in response to the second wake-up condition being satisfied, the second management circuit enables a fifth wake-up signal, wherein in response to the second and fifth wake-up signals being enabled, the main core circuit enters the normal mode from the sleep mode.

9. The control chip as claimed in claim 8, wherein the first management circuit comprises:

a memory configured to store a program code; and a logic circuit reading the memory to perform the program code, wherein:

the logic circuit executes a determination operation to generate a determination result, and in response to the determination result matching a predetermined value, the logic circuit enables the second wake-up signal.

10. The control chip as claimed in claim 1, wherein the first detection circuit comprises:

a timer enabling the first wake-up signal at every fixed time interval.

11. The control chip as claimed in claim 10, wherein:

in response to the first wake-up signal being enabled, the first management circuit determines whether the first wake-up condition is satisfied, in response to the first wake-up condition not being satisfied, the first management circuit resets the timer and enters the sleep mode.

12. A control chip comprising:

a first detection circuit enabling a first wake-up signal in response to a first specific event occurring;

a first management circuit determining whether a first wake-up condition is satisfied in response to the first wake-up signal being enabled, wherein in response to the first wake-up condition being satisfied, the first management circuit enables a second wake-up signal;

a main core circuit entering a normal mode from a sleep mode according to the second wake-up signal; and a second detection circuit determining whether a third specific event occurs, wherein:

in response to the first specific event not occurring, the first management circuit and the main core circuit operate in the sleep mode, in response to the first wake-up condition not being satisfied, the main core circuit operates in the sleep mode, in response to the second wake-up signal being enabled, the main core circuit enters the normal mode from the sleep mode, in response to the third specific event occurring, the second detection circuit enables a third wake-up signal, and in response to the third wake-up signal being enabled, the first detection circuit starts to detect whether the first specific event occurs.

13. A control method for a control chip, comprising:

directing all circuits in the control chip to enter a sleep mode;

utilizing a first detection circuit to detect whether a first specific event occurs;

waking up a management circuit of the control chip in response to the first specific event occurring;

utilizing the management circuit to determine whether a wake-up condition is satisfied;

waking up a main core circuit of the control chip in response to the wake-up condition being satisfied;

waking a second detection circuit up to detect whether a second specific event occurs in response to the first specific event occurring; and waking a third detection circuit up to detect whether a third specific event occurs in response to the second specific event occurring, wherein in response to the third specific event occurring, it is determined that the wake-up condition is satisfied.

14. The control method as claimed in claim 13, further comprising:

directing the second detection circuit to enter the sleep mode in response to the second specific event not occurring.

15. The control method as claimed in claim 13, further comprising:

directing the second and third detection circuits to enter the sleep mode in response to the third specific event not occurring;

directing the third detection circuit to notify the management circuit in response to the third specific event occurring.

16. The control method as claimed in claim 13, wherein:

the first specific event is that a counting value of a counter reaches a target value, and in response to the wake-up condition not being satisfied, the management circuit resets the counter.

* * * * *